United States Patent
Khoury et al.

(10) Patent No.: US 8,224,295 B2
(45) Date of Patent: *Jul. 17, 2012

(54) SYSTEM AND METHOD FOR OPTIMIZING NETWORK COMMUNICATION IN RESPONSE TO NETWORK CONDITIONS

(75) Inventors: Sami Khoury, Seattle, WA (US); David Paul Limont, Seattle, WA (US); Karl S. Johnson, Harpers Ferry, WV (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,558

(22) Filed: Jul. 1, 2011

(65) Prior Publication Data

US 2011/0263227 A1    Oct. 27, 2011

Related U.S. Application Data

(63) Continuation of application No. 12/203,817, filed on Sep. 3, 2008, now Pat. No. 8,060,064, which is a continuation of application No. 11/096,555, filed on Apr. 1, 2005, now Pat. No. 7,437,169.

(51) Int. Cl.
*H04M 1/663* (2006.01)

(52) U.S. Cl. ............... 455/412.2; 455/412.1; 455/414.1; 455/414.2; 455/414.3; 455/414.4; 455/413; 455/415; 455/416; 455/417; 455/418; 455/419; 455/420; 709/203; 709/207; 709/204; 709/205; 709/206; 709/224; 709/231; 709/232

(58) Field of Classification Search ............... 455/412.1, 455/412.2, 414.1–414.4, 413, 415, 416, 417, 455/418, 419, 420; 709/203, 204, 205, 206, 709/207, 224, 231, 232
See application file for complete search history.

(56) References Cited

U.S. PATENT DOCUMENTS

| | | |
|---|---|---|
| 5,177,780 A | 1/1993 | Kasper et al. |
| 5,337,044 A | 8/1994 | Folger et al. |
| 5,509,000 A | 4/1996 | Oberlander |
| 5,631,946 A | 5/1997 | Campana, Jr. et al. |
| 5,673,256 A | 9/1997 | Maine |
| 5,699,511 A | 12/1997 | Porcaro et al. |

(Continued)

FOREIGN PATENT DOCUMENTS

EP    1 259 036 A1    11/2002

(Continued)

OTHER PUBLICATIONS

European Search Report mailed Oct. 26, 2011.

*Primary Examiner* — Patrick Edouard
*Assistant Examiner* — Shantell L Heiber
(74) *Attorney, Agent, or Firm* — Merchant & Gould P.C.

(57) ABSTRACT

A system and method for facilitating communications between a mobile device and a network application are provided. A mobile device transmits a request for data change information that includes a time out interval. The network application receives the request and measures a time elapsed since the receipt of the data change request. The network application will only transmit a notification to the mobile device client if new data is received or the time out interval has elapsed. As notifications are received, the mobile client device tunes the time out interval based upon network and device parameters.

20 Claims, 10 Drawing Sheets

*(1) REGISTRATION REQUEST AND TIME OUT INTERVAL*

*(2) REGISTRATION REQUEST AND TIME OUT INTERVAL*

*(3) REGISTER CLIENT AND BEGIN TIME OUT CLOCK*

U.S. PATENT DOCUMENTS

| | | |
|---|---|---|
| 5,717,737 A | 2/1998 | Doviak |
| 5,732,074 A | 3/1998 | Spaur |
| 5,742,905 A | 4/1998 | Pepe et al. |
| 5,758,088 A | 5/1998 | Bezaire |
| 5,905,777 A | 5/1999 | Foladare et al. |
| 5,956,486 A | 9/1999 | Hickman et al. |
| 5,966,714 A | 10/1999 | Huang et al. |
| 6,052,442 A | 4/2000 | Cooper et al. |
| 6,052,735 A | 4/2000 | Ulrich |
| 6,138,908 A | 10/2000 | Moon et al. |
| 6,198,920 B1 | 3/2001 | Doviak |
| 6,219,694 B1 | 4/2001 | Lazaridis |
| 6,240,426 B1 | 5/2001 | Beyda |
| 6,243,739 B1 | 6/2001 | Schwartz |
| 6,249,807 B1 | 6/2001 | Shaw et al. |
| 6,259,892 B1 | 7/2001 | Helferich |
| 6,311,058 B1 | 10/2001 | Wecker |
| 6,330,436 B1 | 12/2001 | Zidel |
| 6,389,457 B2 | 5/2002 | Lazaridis |
| 6,397,060 B1 * | 5/2002 | Oikawa ............ 455/420 |
| 6,401,085 B1 | 6/2002 | Gershman |
| 6,401,113 B2 | 6/2002 | Lazaridis |
| 6,411,813 B1 | 6/2002 | Sano |
| 6,418,324 B1 | 7/2002 | Doviak |
| 6,438,585 B2 | 8/2002 | Mousseau |
| 6,449,722 B1 | 9/2002 | West |
| 6,463,464 B1 | 10/2002 | Lazaridis |
| 6,473,609 B1 | 10/2002 | Schwartz |
| 6,636,873 B1 | 10/2003 | Carini |
| 6,654,601 B2 | 11/2003 | Picoult |
| 6,684,238 B1 | 1/2004 | Dutta |
| 6,701,378 B1 | 3/2004 | Gilhuly et al. |
| 6,714,797 B1 | 3/2004 | Rautila |
| 6,721,557 B1 | 4/2004 | Ritter |
| 6,738,614 B1 | 5/2004 | Blankenship |
| 6,741,855 B1 | 5/2004 | Martin |
| 6,745,011 B1 | 6/2004 | Hendrickson |
| 6,754,470 B2 | 6/2004 | Hendrickson |
| 6,757,530 B2 | 6/2004 | Rouse |
| 7,016,710 B2 | 3/2006 | Carmeli |
| 7,020,458 B2 | 3/2006 | Bossemeyer, Jr. et al. |
| 7,359,947 B2 | 4/2008 | Kelley et al. |
| 7,437,169 B2 | 10/2008 | Khoury et al. |
| 7,548,886 B2 | 6/2009 | Kirkland et al. |
| 7,568,001 B2 | 7/2009 | McPartlan et al. |
| 7,809,357 B2 | 10/2010 | Hall et al. |
| 2002/0055350 A1 | 5/2002 | Gupte et al. |
| 2002/0174184 A1 | 11/2002 | Bouchard |
| 2003/0013430 A1 | 1/2003 | Skinner et al. |
| 2003/0027608 A1 | 2/2003 | Carmeli et al. |
| 2003/0157947 A1 | 8/2003 | Fiatal et al. |
| 2004/0111516 A1 | 6/2004 | Cain |
| 2004/0165543 A1 | 8/2004 | Nakazawa |
| 2004/0180645 A1 * | 9/2004 | Bussan et al. ............ 455/404.2 |
| 2004/0203854 A1 * | 10/2004 | Nowak ............ 455/456.1 |
| 2006/0079255 A1 | 4/2006 | Bantukul et al. |
| 2006/0168028 A1 | 7/2006 | Duxbury et al. |
| 2007/0143407 A1 | 6/2007 | Avritch et al. |

FOREIGN PATENT DOCUMENTS

| | | |
|---|---|---|
| WO | WO 03/084201 A1 | 10/2003 |
| WO | WO 2004/017583 A1 | 2/2004 |

* cited by examiner

SYSTEM AND METHOD FOR OPTIMIZING NETWORK COMMUNICATION IN RESPONSE TO NETWORK CONDITIONS

CROSS-REFERENCES TO RELATED APPLICATIONS

This application is a continuation of application Ser. No. 12/203,817, filed Sep. 3, 2008 which is a continuation of application Ser. No. 11/096,555, filed Apr. 1, 2005, (now U.S. Pat. No. 7,437,169, Issued Oct. 14, 2008), which claims the benefit of Provisional Application No. 60/577,615, filed Jun. 7, 2004, each of which are hereby incorporated by reference.

BACKGROUND

FIG. 1 is a block diagram illustrative of a system 100 for facilitating the transmission of electronic mail data to a mobile device via a cellular communication network. The system 100 is generally referred to as a "push" data model, in which data, such as electronic mail messages, is transmitted to a client as the data is received. With reference to FIG. 1, the system 100 includes a plurality of clients 102, such as mobile telephones, hand-held devices, etc., that include some form of wireless (e.g., cellular) transmission capability. As illustrated in FIG. 1, each of the mobile devices 102 is in wireless communication with one of several mobile device operators 104. Generally described, a mobile device operator 104 is a service provider that maintains radio frequency-based communication with any number of mobile devices 102. The wireless communication between the mobile devices 102 and the mobile device operator 104, such as via a cellular communication network, is well known and will not be described in greater detail.

With continued reference to FIG. 1, each mobile device operator 104 is also in communication with a data service provider 106. A typical data service provider 106 can be a server computer configured to transmit messages corresponding to identified mobile users. As will be explained in greater detail below, the data service provider 106 monitors for incoming data (e.g., electronic mail messages) and pushes the data to a corresponding mobile operator 104 for transmission to a selected mobile device 102. The network connection between the data service provider 106 and the mobile operators 104 may be via a wireless communication network and/or a wired communication network. The data service provider 106 is also in communication with a number of electronic mail interface computing devices 108. The electronic mail interface computing devices 108 generally correspond to specially configured computing devices that serve as an interface between a local network mail repository 110 and the data service provider 106.

In practice, as updated information, such as a new electronic mail, is received at the network mail repository 110, the electronic mail interface computing device 108 obtains a copy of the mail and forwards a notification to the data service provider 106. The data service provider 106 processes the incoming message notifications and identifies the mobile device 102 that is to receive the mail. The data service provider 106 then forwards a notification and/or the mail to a corresponding mobile operator 104, which transmits the information to the selected mobile device 102.

In this approach, the mobile device 102 receives notifications/data as the data is received by the data service provider 106. Although this approach provides a real-time, or substantially real-time, transmission of data to a mobile device 102, it requires a number of specialized computing device applications and/or specialized business relationships. For example, in a typical embodiment, each local network is required to maintain an electronic mail interface computing device 108 to forward incoming message notifications to the data service provider 106. Additionally, the system 100 requires a centralized information collection and distribution center (e.g., data service provider 106), which typically charges a service fee to each mobile device user. Further, this approach requires the data service provider 106 to maintain appropriate communication interfaces, such as specialized software, and specialized business relationships with a number of mobile operators to allow the data service provider to initiate contact with a selected mobile device 102.

FIG. 2 is a block diagram illustrative of an alternate system 200 for facilitating the transmission of electronic mail data to a mobile device via a cellular communication network. The system 200 is generally referred to as a "pull" data model, in which data, such as electronic mail messages, is transmitted to a client, such as a mobile device, in response to a request for new data by the client. Similar to system 100 (FIG. 1), the system 200 includes a plurality of mobile device clients 202, that have some form of wireless transmission capability (e.g., cellular communication capabilities). Each of the mobile devices 202 is in wireless communication with one of several mobile device operators 204. In this embodiment, however, the wireless communication link between the mobile device operator 204 and each mobile device 202 is not a specialized communication link for transmitting electronic mail messages. Instead, the communication link is a traditional data transmission communication link with a wide area network 206, such as the Internet. For example, in one common embodiment, a wireless enabled mobile device 202 can transmit data across the Internet in accordance with the Transmission Control Protocol (TCP)/Internet Protocol (IP) protocol. The mobile devices 202 utilize the network connection 206 to interface directly with the local electronic mail interface computing devices 208.

In practice, the mobile device 202 establishes a communication link with the electronic mail interface computing device 208, typically through a secure data transmission protocol. The mobile device 202 then transmits a request to receive any updated information (e.g., new electronic mail) directly to the electronic mail interface computing device 208. If there is new data for the mobile device user, the electronic mail interface computing device 208 generates an appropriate response that instructs the mobile device 102 to pull the data from the electronic mail interface computing device 208. If there is not new data, the electronic mail interface computing device 208 generates a negative response to the requesting mobile device 202. Once the mobile device request is processed, the communication link between the mobile device 202 and the electronic mail interface computing device 208 is terminated.

By allowing a direct communication channel between the mobile devices 202 and the electronic mail interface computing devices 208 over a network connection, the system 200 mitigates the need for specialized software/computing devices for each local network and at each mobile operator 204. However, conventional systems using a "pull" data model can become deficient in that incoming data may not be delivered contemporaneously as the data is received. Although this deficiency may be reduced by increasing the frequency in which the mobile devices 204 generate the above described data change requests, the typical methodology for establishing a communication link between a mobile device 204 and the electronic mail interface computing device 208 consumes power resources from the mobile device.

Thus, there is a need for a system and method for facilitating communication between a computing device and a network application that delivers incoming data notifications contemporaneously as the data is received while mitigating the need for specialized software/computing devices for each network.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for facilitating communications between a mobile device and a network application are provided. A mobile device transmits a request for data change information that includes a time out interval. The network application receives the request and measures a time elapsed since the receipt of the data change request. The network application will only transmit a notification to the mobile device client if new data is received or the time out interval has elapsed. As notifications are received, the mobile client device tunes the time out interval based upon network and device parameters.

In accordance with an aspect of the present invention, a method for facilitating communication between a mobile device and a network application is provided. In accordance with the method, a network application obtains a request for change of data. The request for change of data includes a first set of expiration data for returning a response. The network application monitors a time interval for providing a response to the request for change of data. Additionally, the network application, transmits a notification that no data has changed if the time interval exceeds an expiration period.

In accordance with another aspect of the present invention, a method for facilitating communications between a mobile device and a network application is provided. In accordance with the method, a mobile device transmits a first request for change of data. The first request for change of data includes a first set of expiration data for returning a response. The mobile device then determines an event corresponding to the first request for change of data. The mobile device generates a second set of expiration data for returning a response based upon at least one network condition. Additionally, the mobile device transmits a second request for change of data. The second request for change of data includes the second set of expiration data for returning a response.

In accordance with a further aspect of the present invention, a system for facilitating data exchange is provided. The system includes one or more client devices for generating a request for change of data. The request for generating a change of data includes a first expiration time period. The system further includes at least one network application for receiving the request for change of data and transmitting a notification that no data has changed if a monitored time period corresponding to the first expiration time period has expired. The one or more client devices transmit a subsequent request for change of data if an event has occurred. The subsequent request for change of data includes a second expiration time period.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In general, the present invention relates to mobile devices, computer software and communication devices, and in particular, to a system and method for optimizing network communication in response to network conditions. Generally described, mobile devices, such as mobile telephones and hand-held devices, utilize communication networks to exchange data with other mobile devices and/or computer devices. In a typical embodiment, a mobile device can utilize a wireless communication network, and various network protocols, to transmit and receive data. In such an embodiment, a mobile device can maintain continuous, or semi-continuous, wireless connections to allow a user with a mobile device to receive and transmit electronic mail.

As the computing device processing resources and wireless network communication bandwidth continue to increase, the use of wireless enabled mobile devices to receive/transmit electronic mail has substantially increased.

Generally described, the present invention relates to a system and method for optimizing communication between a client device and a network application. More specifically, the present invention is directed toward a system and method for optimizing communication between a mobile device and a network application via a wireless network. The present invention will be described with regard to an architecture incorporating a pull data model in which the mobile device requests data change information in the form of electronic mail messages from a network application. Further, the present invention will be described with regard to the utilization of a time out interval to maintain a communication link between a mobile device and a network application. Although the present invention will be described with regard to a mobile devices, wireless communication networks, and/or electronic mail transmissions, one skilled in the relevant art will appreciate that the disclosed embodiments are illustrative in nature and should not be construed as limiting.

Figure 1:
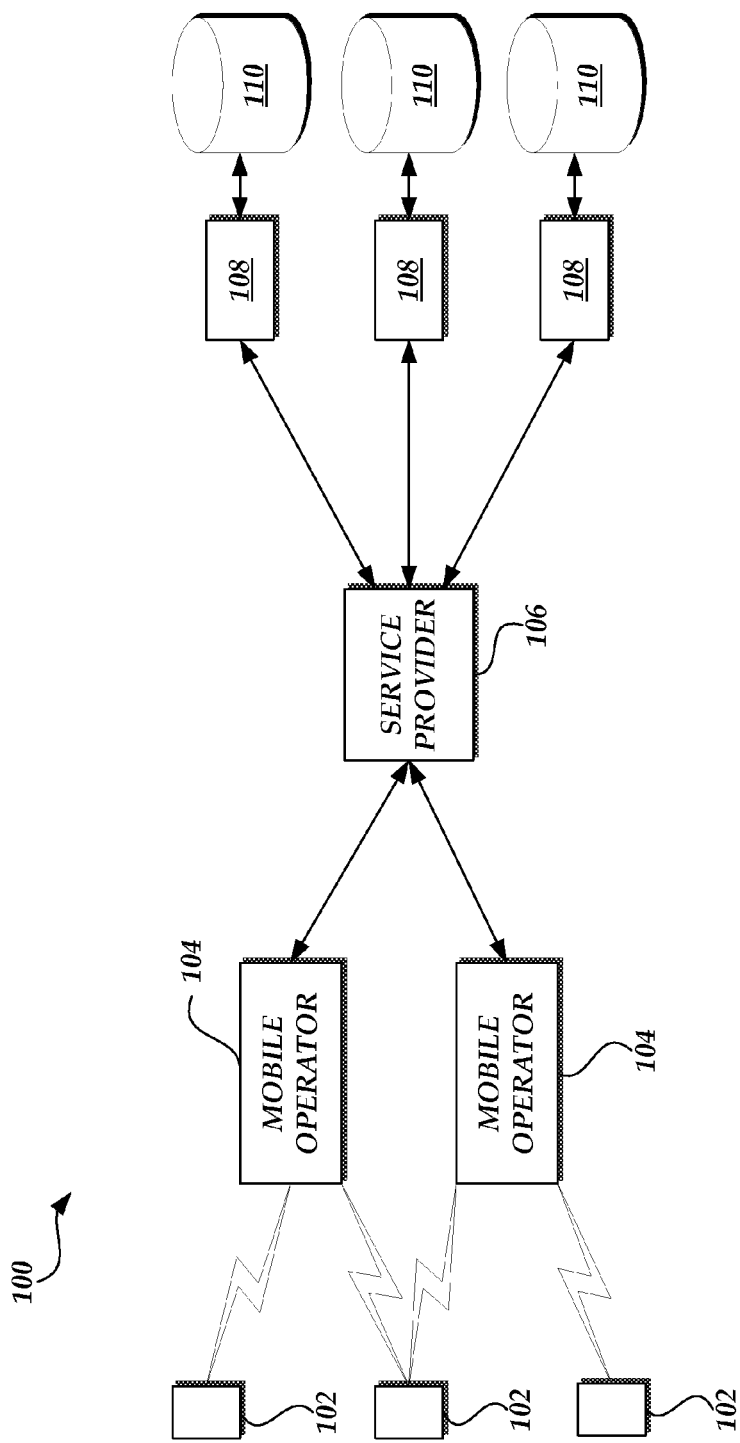
FIG. 1 is a block diagram of a system for facilitating the transmission of electronic mail data to a mobile device via a cellular communication network in accordance with a push data model.
Figure 2:
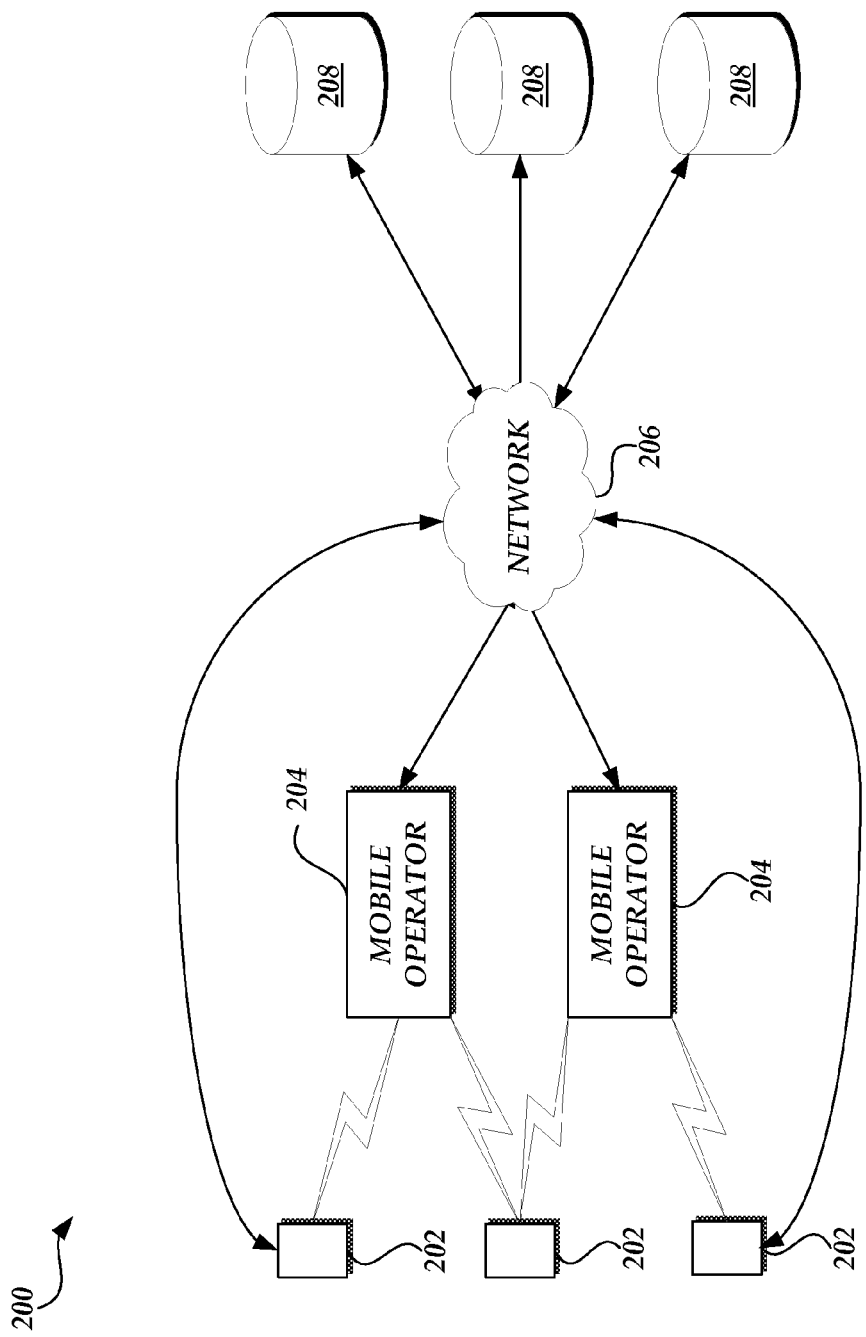
FIG. 2 is a block diagram of a system for facilitating the transmission of electronic mail to a mobile device via a cellular communication network in accordance with a pull data model.

In an illustrative embodiment of the present invention, a system implementing a pull data model, such as system 200 (FIG. 2), may be utilized to facilitate the transmission of information between a client, such as a mobile device 202, and a network application, such as an electronic mail interface computing device 208. The mobile device 202 and the electronic mail interface computing device 208 transmit information via a typical network data connection 206, such as the Internet. The connection from the network 206 to the mobile device 202 may be facilitated through a mobile device operator 204 (e.g., a data connection via a wireless communication link) or via a direct wireless connection to the network (e.g., a Bluetooth protocol wireless connection).

In accordance with the present invention, a mobile device issues a data change request to the electronic mail interface computing device 208. The data change request can include a registration request for new data that has arrived at the electronic mail interface computer device 208 (e.g., a new email message) and a time-out interval. The time-out interval specifies a time in which the electronic mail interface computing device 208 is required to provide a positive or negative response to the registration request for new data. Unlike traditional data change requests, the electronic mail interface computing device 208 does not provide an immediate response to the data change request if no new data is available. Instead, the electronic mail interface computing device 208 maintains a communication link with the mobile device 202 until it detects an information change (e.g., the arrival of new electronic mail) or the expiration of the time out interval. Upon occurrence of either event, the electronic mail interface computing device 208 transmits an appropriate response to the mobile device 202. In turn, the mobile device 202 can update the time-out interval according to various network conditions and sends a subsequent data change request with the updated time out interval. By maintaining communication even when no data has been received, the electronic mail interface computing device 208 prevents the termination of the communication link with the mobile device 202.

With reference now to FIGS. 3A-3D, various embodiments for processing a client request having a time out interval in accordance with the present invention will be described.

Figure 3A:
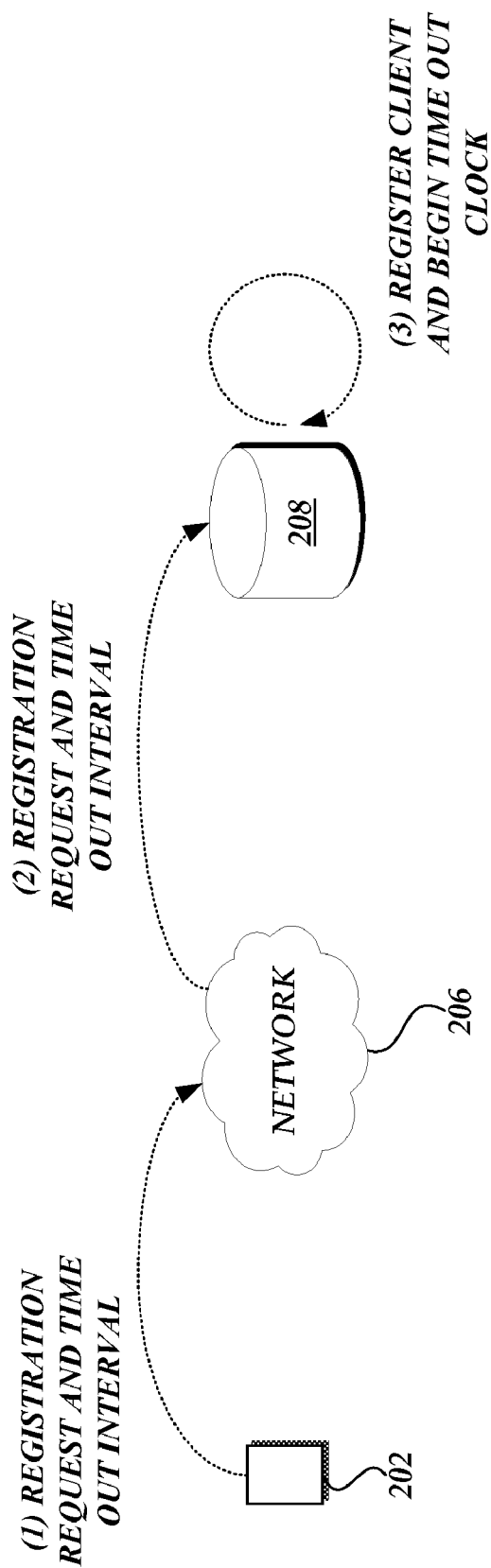
FIG. 3A is a block diagram of the system of FIG. 2 illustrating the generation of a data change request by a mobile device including a time out interval in accordance with an aspect of the present invention.

With reference to FIG. 3A, the process is initiated by the generation of a registration request and time out interval by a client on a mobile device. In an illustrative embodiment of the present invention, the registration request can include the registration of the type of information the client wishes to receive and various configuration information, such as notification preferences, client authentication information, and the like. As will be described in greater detail below, the time out interval may be in the form of a fixed time period or as a set of criteria that allows for the calculation of a time out interval. The time out interval may be a default period set by the mobile device client application, the mobile device operator 204 and the electronic mail interface computing device 208. For example, a mobile device operator 204 may maintain their own time out interval that will result in a dropped communication link if no data is passed between the mobile device 202 and the electronic mail interface computing device 208 during the mobile device operator-specified time out interval. Accordingly, a default time out interval would likely be of a value less than the time out interval specified by the particular mobile device operator 204 used by the mobile device 202. The registration request and time out interval is transmitted over the network 206 and is received by the electronic mail interface computing device 208 or a specialized application on the electronic mail interface computing device 208.

Upon processing the registration request, the electronic mail interface computing device 208 registers the mobile device client for receipt of all requested information, as authorized. As described above, if no new data is currently available for the registered client, the electronic mail interface computing device 208 does not automatically transmit a negative response to the mobile device 202. However, because the data change request remains pending and the communication link is not immediately terminated.

Figure 3B:
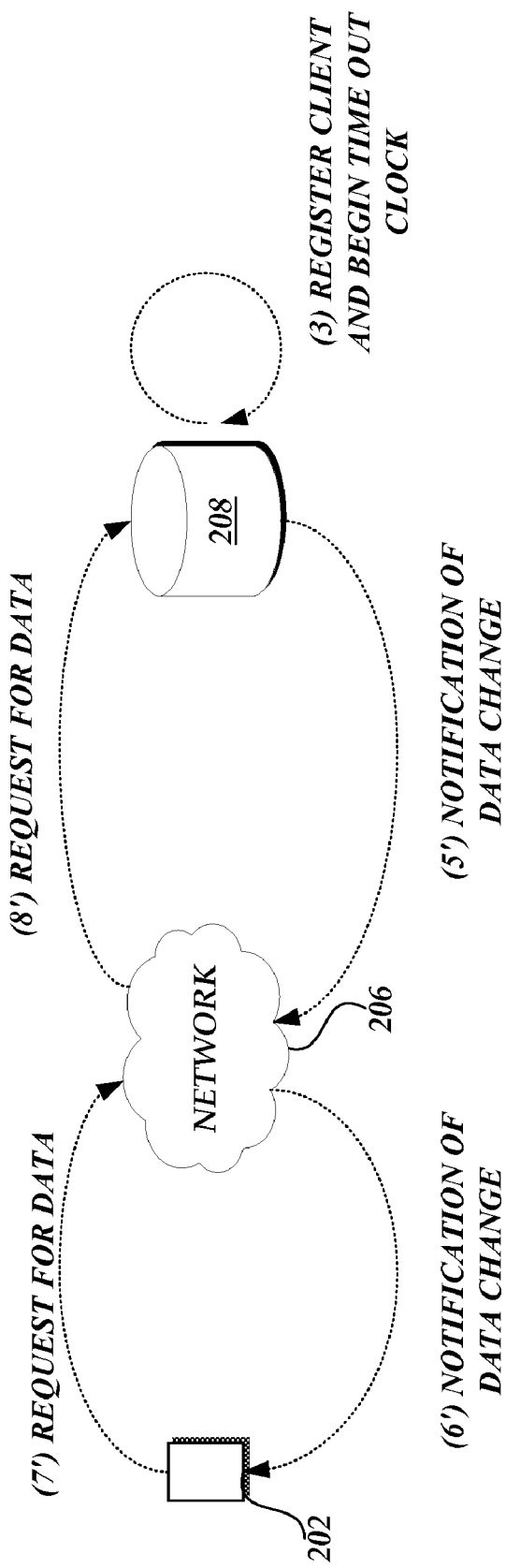
FIG. 3B is a block diagram of the system of FIG. 2 illustrating the transmission of a notification of a data change by a network application in accordance with an aspect of the present invention.

With reference now to FIG. 3B, in one embodiment, the electronic mail interface computing device 208 receives a notification that a data change has occurred that needs to be passed to the mobile device 202. In an illustrative embodiment of the present invention, the notification can include a notification from an electronic mail repository, such as an electronic mail server/client, that a user corresponding to the mobile device 202 has received a new electronic mail. The electronic mail interface computing device 208 transmits a notification to the mobile device 202, via the network 206, that the new data is available. In an illustrative embodiment of the present invention, the notification can include descriptive information or other criteria that may be used by the user and/or mobile device to decide whether the data will be retrieved. If the data is to be retrieved, the mobile device 202 transmits a request for data retrieval to the electronic mail interface computing device 208 in accordance with traditional and well-known data protocols, such as the Hypertext Transfer Protocol ("HTTP"), which will not be explained in greater detail. Once the data has been retrieved, the process illustrated in FIG. 3A can be repeated by the transmission of a new data registration request and time out interval by the mobile device 202.

Figure 3C:
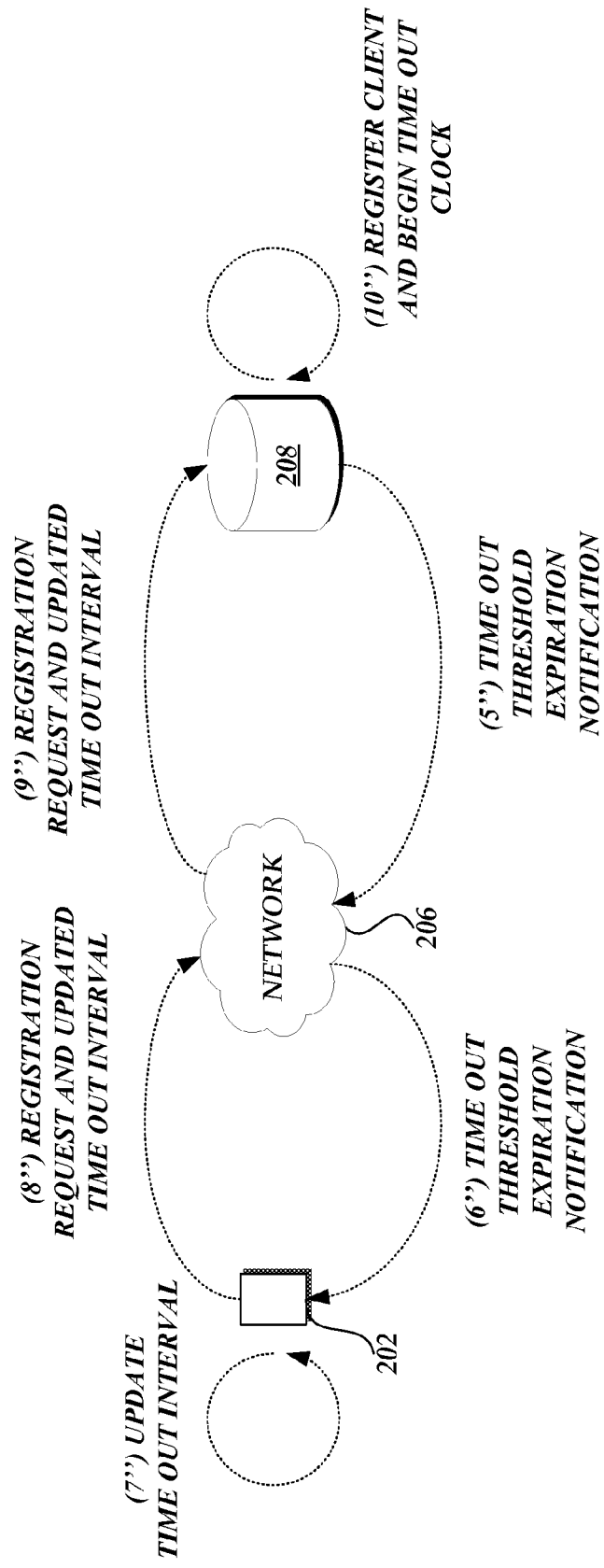
FIG. 3C is a block diagram of the system of FIG. 2 illustrating the transmission of a time out interval expiration notification by a network application in accordance with an aspect of the present invention.

With reference now to FIG. 3C, in another embodiment, the electronic mail interface computing device 208 continues to monitor the elapsed period time since the last communication for each registered mobile device client. If the electronic mail interface computing device 208 detects that the time out interval for registered client has expired, it transmits a notification to the mobile device 202 that the time out interval has expired and no new data notifications have been received. By transmitting the time out interval expiration notification, the electronic mail interface computing device 208 prevents the communication link with the mobile device 202 from being terminated, or dropped, by the mobile device operator 204.

As will be explained in greater detail below, upon receipt of the time out interval expiration notification, the mobile device 202 may update the previous time out interval. In an illustrative embodiment of the present invention, the mobile device 202 updates the time out interval by measuring or observing one of a variety of network conditions. The mobile device 202 then determines whether the time out interval should be adjusted based upon the measured, or observed, network conditions. Upon tuning, or adjusting, the time out interval, the mobile device 202 transmits a new registration request with the updated time out interval via the network 206. The electronic mail interface computing device 208 obtains the new request and repeats the registration process and time out clock measurement with the updated time out interval.

Figure 3D:
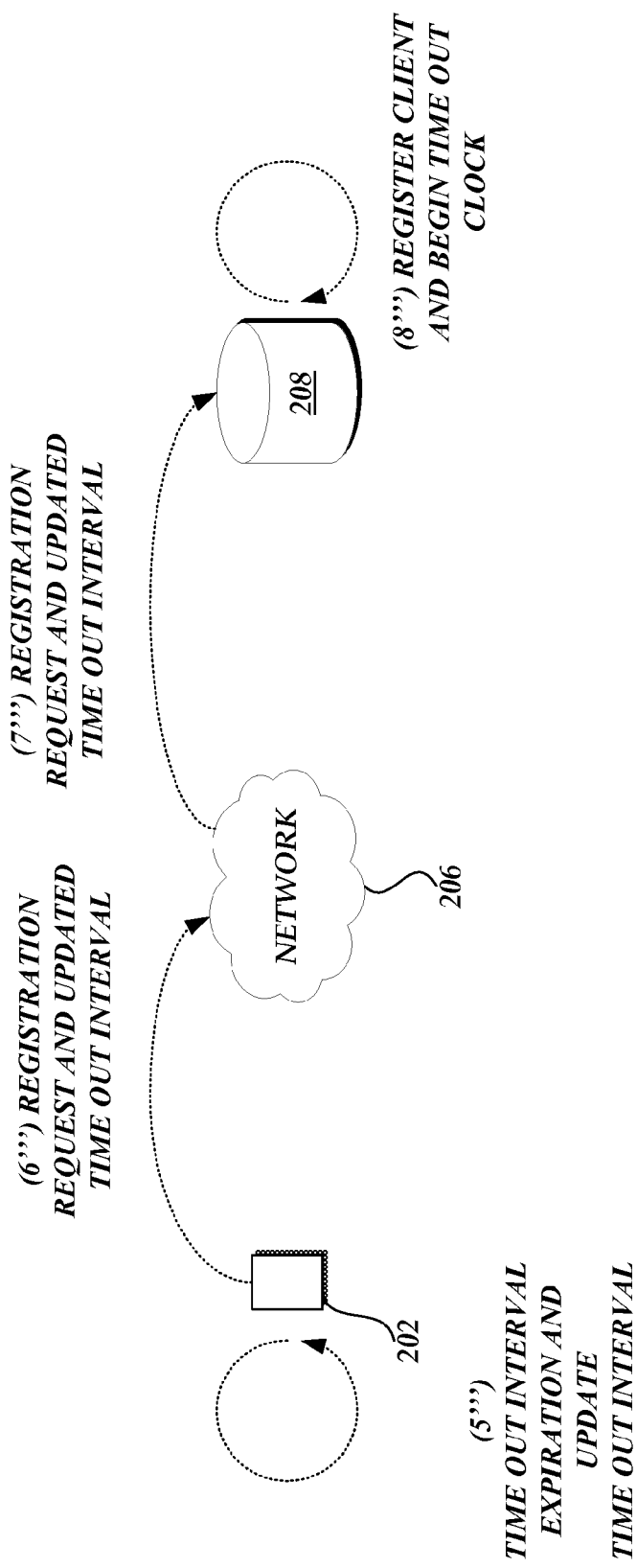
FIG. 3D is a block diagram of the system of FIG. 2 illustrating the processing of a time out interval expiration by a mobile device in accordance with an aspect of the present invention.

With reference now to FIG. 3D, in further embodiment, the mobile device 202 also monitors the time expired since the transmission of the previous registration request. If the mobile device 202 detects the expiration of the time out interval and it has not received a no new data notification from the electronic mail interface computing device 208, it assumes that communication link has been terminated or otherwise dropped. Accordingly, the mobile device 202 updates the time out interval and transmits a registration request with the updated with the updated time out interval via the network 206. The electronic mail interface computing device 208 obtains the new request and repeats the registration process and time out clock measurement with the updated time out interval. As described above, the mobile device 202 would also monitor the updated time out interval associated with the new request.

Figure 4:
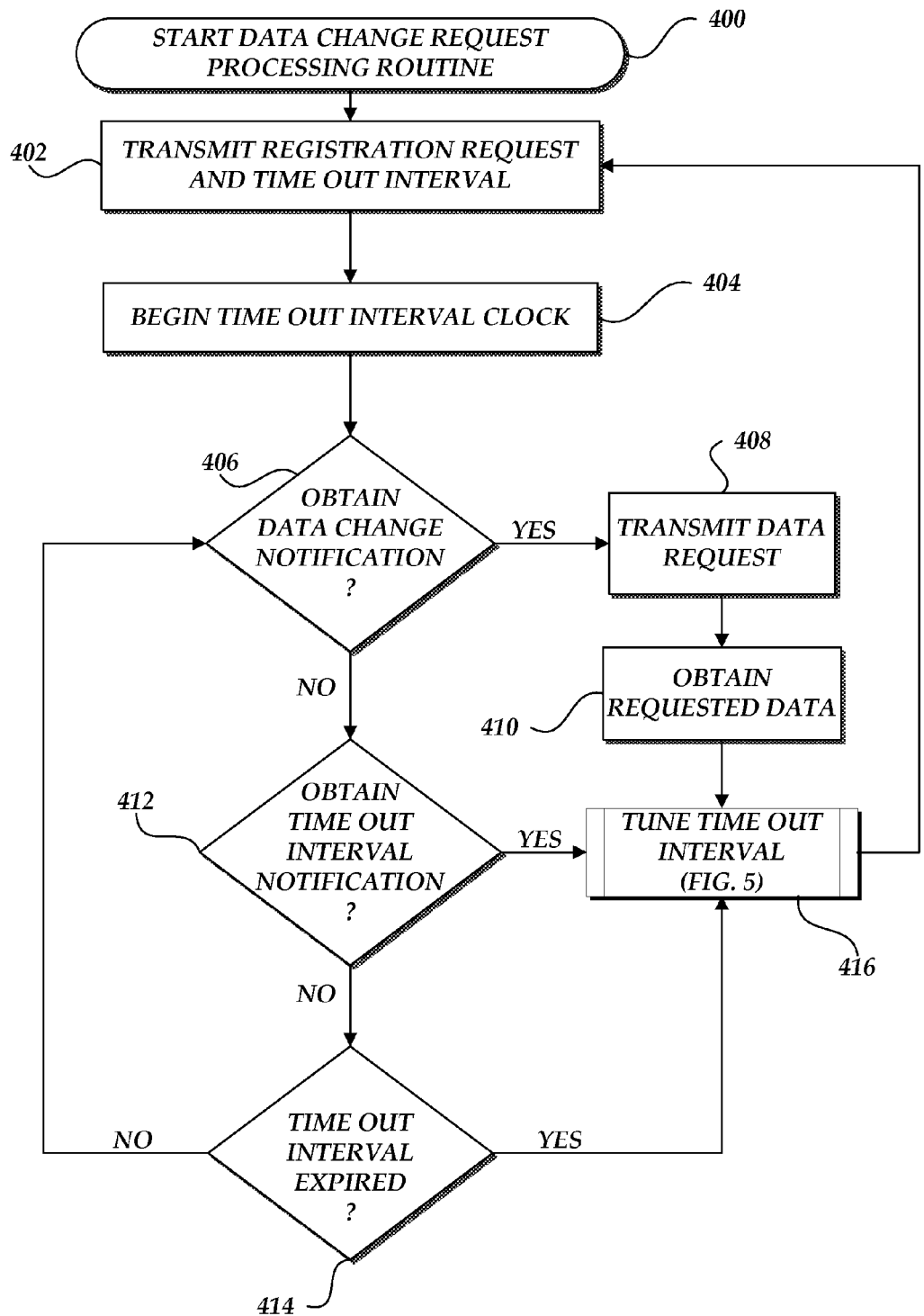
FIG. 4 is a flow diagram illustrative of a data change request transmission and monitoring routine implemented by a mobile device client in accordance with an aspect of the present invention.

With reference to FIG. 4, a flow diagram illustrative of a routine 400 implemented by a mobile device 202 to transmit and monitor a data change request to an electronic mail interface computing device 208 in accordance with the present invention will be described. At block 402, the mobile device transmits a registration request and time out interval to the electronic mail interface computing device 208. In an illustrative embodiment of the present invention, the registration request may correspond to a selection of one or more data types, specific data files, or application programs that the mobile device may wish to receive updated information from. For example, a registration may indicate that a user wishes to receive notification when new electronic mail is received or when a particular document has been updated. The registration request may also correspond to criteria, such as rules or keywords, for selecting which data to transmit to the mobile device. The registration request can also include credentials, or other authentication information, that may be needed to receive updated information.

In accordance with an illustrative embodiment of the present invention, the time out interval information may include the specification of a fixed expiration period or length of time to be added to a current time of day. Alternatively, the time out interval information may be specified in terms of selective criteria that facilitates the generation of a time out period, or expiration period. At block 404, the mobile device 202 begins a time out clock that measures the time expired from the transmission of the registration request by mobile device 202 or the receipt of the registration request by the electronic mail interface computing device 208. The time expired can be measured in any one of a variety of manners.

At decision block 406, a test is conducted to determine whether the mobile device 202 has received a data change notification from the electronic mail interface computing device 208. If the mobile device 202 has received the data notification, at block 408, the mobile device transmits a data request to the electronic mail interface computing device 208. In an illustrative embodiment of the present invention, the data request corresponds to a request for the actual data from the electronic mail interface computing device 208, such as an HTTP data request. At block 410, the mobile device 202 obtains the requested data from the electronic mail interface computing device 208. The routine 400 then proceeds to block 416 to tune the previously provided time out interval, which will be explained in greater detail below.

Returning to decision block 406, if the mobile device 202 has not received a data change notification from the electronic mail interface computing device 208, at decision block 412, a test is conducted to determine whether the mobile device has received a time out interval expiration notification from the electronic mail interface computing device 208. If a time out interval expiration notification has been received, the routine 400 proceeds to block 416, which will be explained in greater detail below.

Returning to decision block 412, if the mobile device has not received a time out interval expiration notification from the electronic mail interface computing device 208, at decision block 414, a test is conducted to determine whether the time out interval has expired. As described above, at block 404, the mobile device measures a time expired since the transmission of the registration request. If the time out interval has not expired, the routine 400 returns to decision block 406. Alternatively, if the mobile device 202 detects that the time out interval has expired, it can assume that the electronic mail interface computing device 208 has failed to transmit a time out interval expiration notification and/or that the communication link with the electronic mail interface computing device 208 has expired.

Figure 5:
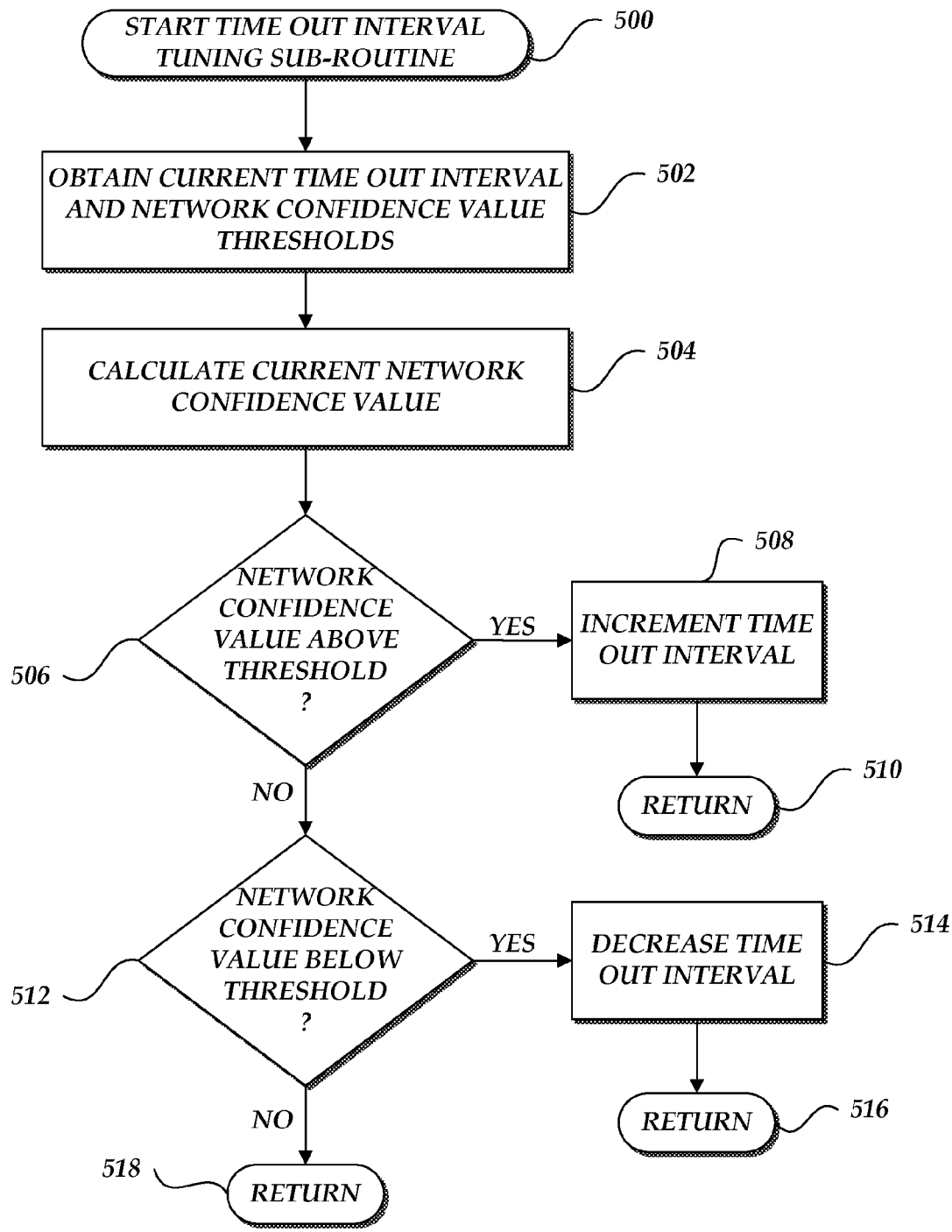
FIG. 5 is flow diagram illustrative of time out interval tuning sub-routine implemented by a mobile device client in accordance with an aspect of the present invention.

In an illustrative embodiment of the present invention, the mobile device may also wait for an additional period of time to account for possible delays/lags in transmissions from the electronic mail interface computing device 208. Accordingly, the routine 400 then proceeds to block 416 to tune the previously provided time out interval. Block 416 will be explained in greater detail with regard to sub-routine 500 (FIG. 5). Once the time out interval has been tuned, the routine 400 returns to block 402, where the mobile device transmits a new registration request with the tuned time out interval.

With reference now to FIG. 5, an illustrative sub-routine 500 implemented by the mobile device 202 for tuning the time out interval, corresponding to block 416 (FIG. 4) will be described. In an illustrative embodiment of the present invention, the tuning of the time out interval corresponds to a comparison of a sum of a window of network communication events (e.g., consecutive tuning events) to a plurality of network confidence value thresholds based upon possible values of the same window of network communication events.

At block 502, the mobile device obtains a current time out interval and one or more threshold network confidence values. In an illustrative embodiment of the present invention, the current time out interval can correspond to a time out interval that was previously used by the mobile device. Additionally, the current time out interval can correspond to a default time out interval set by the mobile device 202, mobile device operator 204 or any other component. In an illustrative embodiment of the present invention, the threshold network confidence values correspond to a maximum threshold value that will be used to increment the current time out interval. The threshold values correspond to a minimum threshold value that will be used to decrement the current time out interval. The maximum and minimum threshold values represent a function of the maximum and minimum possible network confidence values for a given window of tuning events.

At block 504, the mobile device 202 calculates a current network confidence value for the defined window of tuning events. In an illustrative embodiment of the present invention, the mobile device 202 can take into account any number of events corresponding to network communications. The events can correspond to internal events specific to the mobile device 202. For example, the network events can include, but are not limited to device battery life, internal measurement signal strength, processing resource utilization, user-specified criteria, and the like. The events can also correspond to external event specific to the interaction of the mobile device 202 and the network 206 and/or the network itself. For example, the events can include a dropped communication link, a transport error, transmission speed measurements, successful receipt of information, external measurement of signal strength, external component performance metrics, and the like.

In an illustrative embodiment of the present invention, each network event can be associated with a value, such as a weight, that reflects the potential effect on a communication link. In one embodiment, the values for each event can correspond to binary values of "1" for a positive event and "−1" for a negative event. In another embodiment, the values for each event can correspond to a range of values from "−1" to "1". In such an embodiment, each network event may be accorded a weight reflective of the severity of the network event relative to other possible events. In still a further embodiment, the range of values may be all positive values with higher values reflect more positive communication link events.

To calculate a network confidence value, the sum of the weight for each event within the window of previous tuning events is calculated. In an illustrative embodiment of the present invention, the weight for each event is reduced by the time elapsed since the event occurred. Equation (1) defines the sum as follows:

$$n = \left( \sum_{j=1}^{k} \frac{e_j}{t_0 - t_{e_j}} \right) + e_0 \quad (1)$$

where n corresponds to the network confidence value;
$e_j$ corresponds to a weight for each network event; and
$t_x$ corresponds to a measurement of a time when the network event occurred.

With continued reference to FIG. 5, at decision block 506, a test is conducted to determine whether the calculated network confidence value is above the maximum threshold. In an embodiment in which the positive, or larger value, weights represent a positive event, if the calculated network confidence values is above the threshold, the time out interval is incremented at block 508. The sub-routine 500 returns at block 510.

In an illustrative embodiment of the present invention, the time out interval may be incremented by a previously defined discrete amount. Alternatively, the time out interval may be increased in an amount proportional to the calculated network confidence value. Still further, the time out interval may be incremented by a schedule that can take into account factors such as repeated positive network events, the value of calculated network confidence, and the like. For example, the mobile device 202 may only increase the time out interval if has tracked a number of immediately preceding positive events (e.g., 5 positive events in a row). In another example, the mobile device 202 will increase the time out interval by an amount that will continuously increase according to the number of consecutive positive events. In still a further example, the mobile device 202 may increase the time out interval to a maximum amount upon tracking one or more positive events. In an illustrative embodiment of the present invention, the mobile device 202 may limit the time out interval increments to a maximum threshold, such as the mobile device operator 204 network time out interval.

If the calculated network confidence value is not above the threshold, at decision block 512, a test is conducted to determine whether the calculated network confidence value is below the minimum threshold. In an embodiment in which the negative value, or lower value, weights represent a negative event, if the calculated network confidence values is below the threshold, at block 514, the time out interval is decreased. The sub-routine 500 returns at block 516. If, however, at decision block 512, the calculated network confidence value is not below the minimum threshold, the time out interval is not adjusted and the sub-routine 500 returns at block 518.

Similar to block 508, the time out interval may be decreased by a previously defined discrete amount. Alternatively, the time out interval may be decreased in an amount proportional to the calculated network confidence value. Still further, the time out interval may be decreased by a schedule that can take into account factors such as repeated negative network events, the value of calculated network confidence, and the like. For example, the mobile device 202 may only decrease the time out interval if it has tracked a number of immediately preceding negative events (e.g., 3 negative events in a row). In another example, the mobile device 202 will decrease the time out interval by an amount that will continuously increase according to the number of consecutive negative events. In still a further example, the mobile device 202 may set the time out interval to a minimum amount upon tracking one or more negative events.

Figure 6:
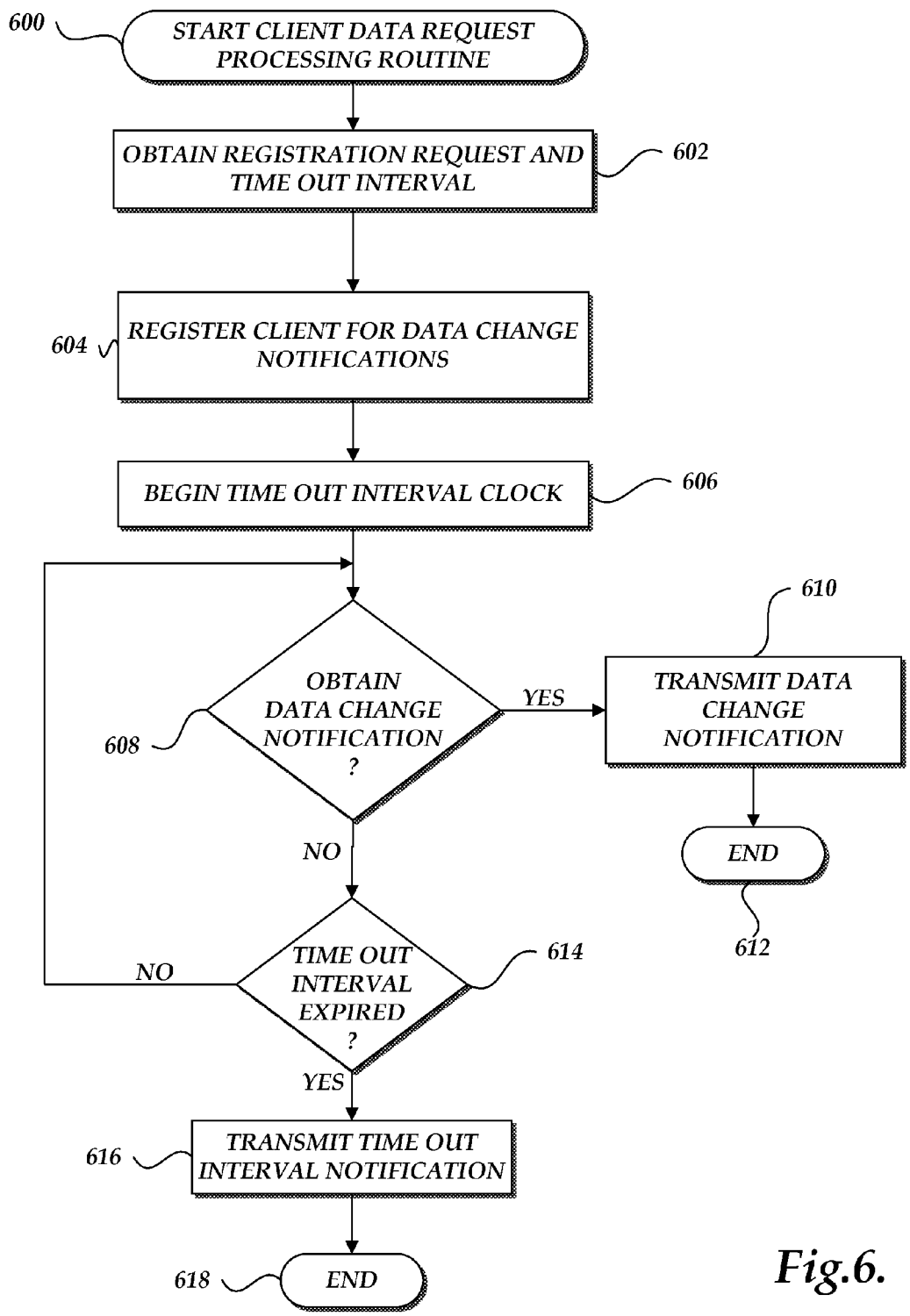
FIG. 6 is a flow diagram illustrative of client data change request processing routine implemented by a network application in accordance with the present invention.

With reference now to FIG. 6, a routine 600 implemented by a network application, such as electronic mail interface computing device 208, for processing a mobile device registration request will be described. At block 602, the electronic mail interface computing device 208 obtains the mobile device registration request that includes a time out interval. At block 604, the electronic mail interface computing device 208 registers the mobile device 202 for the requested data. In an illustrative embodiment of the present invention, the registration can correspond to communication with any appropriate local network components, such as an electronic mail server, to allow the electronic mail interface computing device 208 to receive notification of new data. Additionally, the registration can correspond to the calculation of a time out interval if the registration request included criteria for calculating an appropriate time out interval. In the event that the registration request corresponds to multiple data change requests, the electronic mail interface computing device 208 can maintain a table for tracking criteria for forwarding the mobile client 202 information.

At block 606, the electronic mail interface computing device 208 begins a time out interval clock that measures the time elapsed since the receipt/processing of the registration request. In an illustrative embodiment of the present invention, the time out interval clock can correspond to an internal counting device that measures a time elapsed since the receipt of the registration request. Alternatively, the time out clock can correspond to a recordation of a time of day that the registration request was received for comparison with standard time of day measurements by the electronic mail interface computing device 208. One skilled in the relevant art will appreciate that any number of additional methodologies may be utilized to calculate, or otherwise track, a time elapsed since the receipt/processing of a registration request.

At decision block 608, a test is conducted to determine whether the electronic mail interface computing device 208 has received a notification of data change. In an illustrative embodiment of the present invention, the notification of data change can correspond to receipt of a new mail notification from an electronic mail server. Additionally, the notification of data change can correspond to a notification that a particular data file has been modified, accessed, etc. If a data change notification is received, at block 610, the electronic mail interface computing device 208 transmits a data change notification to the mobile device 202. In an illustrative embodiment of the present invention, the data change notification can include a generic message instructing the mobile device 202 to transmit a data request to the electronic mail interface computing device 208. Additionally, the data change notification can include various meta data or descriptive information that allows the mobile device 202 to select whether the device will transmit a subsequent data request. For example, the notification can include electronic mail message header information that allows the user to preview at least a portion of the message to determine whether he or she would like the entire message retrieved. In another example, the notification can include specific criteria that allow the mobile device 202 to automatically determine whether to request the change data. At block 612, the routine 600 terminates until the next registration request is received by the electronic mail interface computing device 208.

If, at decision block 608, a notification that data has changed is not received, at decision block 614, a test is conducted to determine whether a time elapsed since the receipt/processing of the registration request exceeds the time out interval. If the time out interval has not been exceeded (e.g., expired), the routine 600 returns to decision block 608. If the time out interval has expired, at block 616, the electronic mail interface computing device 208 transmits an expired time out interval notification to the mobile device 202. In an illustrative embodiment of the present invention, the expired time out interval notification corresponds to a message that maintains the communication link and that will elicit a renewed registration request by the mobile device 202. Additionally, the expired time out interval notification can include additional information, such as network event information or network characteristic information (e.g., available bandwidth, network quality ratings, etc.) that be utilized to tune subsequent time out intervals. At block 618, the routine 600 terminates.

Figure 7:
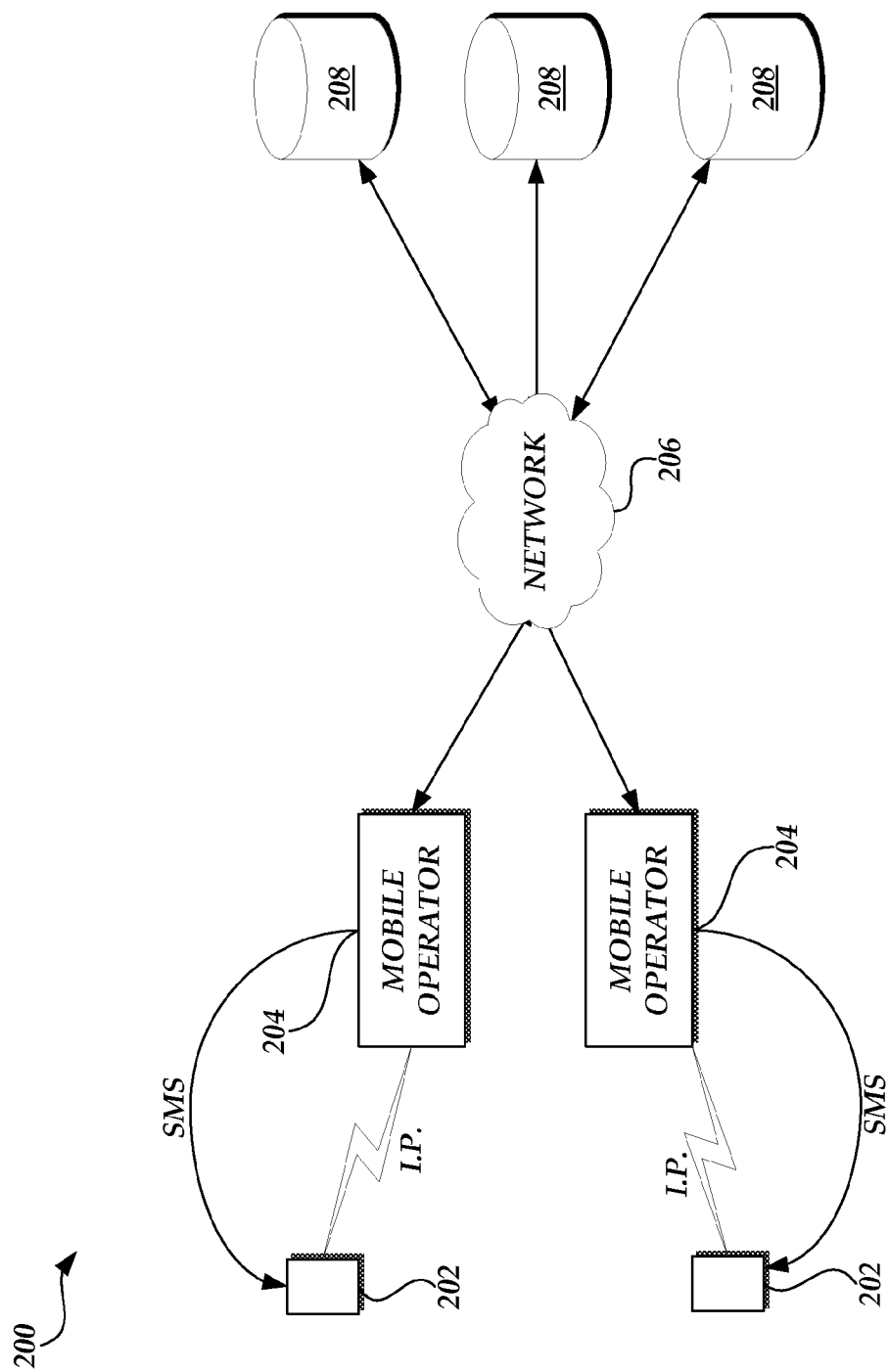
FIG. 7 is a block diagram of a system for facilitating the transmission of electronic mail to a mobile device via a cellular communication network and a separate notification channel in accordance with an aspect of the present invention.

With reference now to FIG. 7, in an alternative embodiment of the present invention, the present invention may utilize one or more additional communication channels to transmit data change notifications or time out interval expiration notifications. In accordance with this embodiment, during the data change registration request, the mobile device 202 can include notification preference information for the data change notifications and/or the time out interval expiration notification. In one example, the electronic mail interface computing device 208 can transmit data to the mobile device operator 204, which can include a specification of which communication channel to utilize for communicating with the mobile device 202. As illustrated in FIG. 7, the mobile device operator 204 can utilize a wireless data channel (e.g., an I.P. communication channel) or a short message service ("SMS") data channel to transmit information.

In an illustrative embodiment of the present invention, the electronic mail interface computing device 208 can utilize various criteria to select which communication channel to utilize. For example, a user may specify preferences based upon time of day or size of data to be transmitted. Additionally, a user may specify cost savings preferences based on usage, data transmission bandwidth, and/or mobile operator charges. Further, the user may specify preferences based upon network criteria, such as available bandwidth or communication channel latency.

While illustrative embodiments have been illustrated and described, it will be appreciated that various changes can be made therein without departing from the spirit and scope of the invention.

The invention claimed is:

1. A method for facilitating communication between a mobile device and a network application using an electronic mail interface computing device, the method comprising:

obtaining, at the electronic mail interface computing device, a request for change of data from the mobile device, the request for change of data including a set of expiration data, and wherein the expiration data defines a time interval for returning a response to the mobile device from the electronic mail interface computing device;

monitoring, at the electronic mail interface computing device, electronic mail data during the time interval for providing a response to the request for change of data;

determining whether the electronic mail data has changed prior to expiration of the time interval, and if so, transmitting a response including changed data to the mobile device prior to expiration of the time period; and if the time interval expires and no electronic mail data has changed, transmitting from the electronic mail interface computing device a notification to the mobile device that no electronic mail data has changed after expiration of the time interval.

2. The method of claim 1, further comprising:

obtaining a second request for change of data, the second request for change of data including a second set of expiration data for returning a response;

monitoring a second time interval for providing a response to the second request for change of data, the second time interval based on the second set of expiration data; and transmitting a notification that no data has changed if the time interval exceeds a second expiration period.

3. The method of claim 2, wherein the second time interval is different from the time interval.

4. The method of claim 2, wherein the second set of expiration data corresponds to an adjustment of the first set of expiration data based upon a set of events related to communication between the mobile device and the network application.

5. The method of claim 4, wherein the adjustment of the first set of expiration data is based at least in part on a network confidence value.

6. The method of claim 1, wherein the request for change of data includes a notification preference indicating a preference to first receive truncated portions of messages before receiving entire retrieved electronic messages.

7. The method of claim 6, wherein transmitting the response includes transmitting a truncated portion of changed data.

8. The method of claim 1, wherein the changed electronic mail data includes an electronic mail message header allowing a preview of at least a portion of an electronic mail message prior to receipt at the mobile device of the entire message.

9. A method for facilitating communication between a mobile device and a network application using an electronic mail interface computing device, the method comprising:

transmitting from a mobile device a request for change of data to an electronic mail interface computing device, the request for change of data including a set of expiration data defining a time interval for returning a response to the mobile device from the electronic mail interface computing device;

if electronic mail data has changed prior to expiration of the time interval, receiving a response at the mobile device from the electronic mail interface computing device prior to expiration of the time period, the response including changed electronic mail data; and if the time interval expires and no electronic mail data has changed, receiving a notification at the mobile device from the electronic mail interface computing device after expiration of the time interval, the notification indicating that no electronic mail data has changed.

10. The method of claim 9, further comprising:

monitoring at the mobile device time elapsed between a first time at which the request for change of data is transmitted and a second time at which the response or the notification is received; and transmitting a second request for change of data including a second set of expiration data for returning a response, the second set of expiration data defining a second time interval that differs from the time interval.

11. The method of claim 10, further comprising generating the second set of expiration data at least in part based on the time elapsed.

12. The method of claim 10, further comprising generating the second set of expiration data based on a network confidence value.

13. The method of claim 12, wherein the network confidence value is a sum of a summand and a weight of an initial network event, the summand being another sum of one or more quotients of a dividend and a divisor, the dividend being a weight of a network event at a particular time, the divisor being a remainder of a measurement of time of the initial network event as a minuend and a measurement of time of the network event at the particular time as a subtrahend.

14. The method of claim 9, wherein notification received at the mobile device further includes information about available bandwidth between the electronic mail interface computing device and the mobile device.

15. The method of claim 9, wherein the changed electronic mail data includes an electronic mail message header allowing a preview of at least a portion of an electronic mail message prior to receipt at the mobile device of the entire message.

16. A system comprising:

a mobile device configured for transmitting a request for change of data to an electronic mail interface computing device, the request for change of data including a set of expiration data defining a time interval for returning a response to the mobile device from the electronic mail interface computing device;

an electronic mail interface computing device configured for monitoring electronic mail data during the time interval for providing a response to the request for change of data;

wherein if electronic mail data has changed prior to expiration of the time interval, the electronic mail interface computing device transmits a response to the mobile device prior to expiration of the time period, the response including changed electronic mail data; and wherein if the time interval expires and no electronic mail data has changed, the electronic mail interface computing device transmits a notification to the mobile device after expiration of the time interval, the notification indicating that no electronic mail data has changed.

17. The system of claim 16, wherein the changed electronic mail data includes an electronic mail message header allowing a previous of at least a portion of an electronic mail message prior to receipt at the mobile device of the entire message.

18. The system of claim 16, wherein the mobile device is further configured for previewing one or more electronic mail messages based on the changed electronic mail data prior to receiving the entire one or more electronic mail messages.

19. The system of claim 16, wherein the mobile device is further configured for adjusting the first set of expiration data at least in part based on a network confidence value.

20. The system of claim 19, wherein the network confidence value is a sum of a summand and a weight of an initial network event, the summand being another sum of one or more quotients of a dividend and a divisor, the dividend being a weight of a network event at a particular time, the divisor being a remainder of a measurement of time of the initial network event as a minuend and a measurement of time of the network event at the particular time as a subtrahend.

* * * * *